United States Patent [19]

Roffe et al.

[11] 4,262,482
[45] Apr. 21, 1981

[54] APPARATUS FOR THE PREMIXED GAS PHASE COMBUSTION OF LIQUID FUELS

[76] Inventors: Gerald A. Roffe, 3 Markwood La., East Northport, N.Y. 11731; Horacio A. Trucco, 13 Saddler Ct., Huntington Station, N.Y. 11746

[21] Appl. No.: 49,614

[22] Filed: Jun. 18, 1979

Related U.S. Application Data

[63] Continuation-in-part of Ser. No. 852,225, Nov. 17, 1977, abandoned.

[51] Int. Cl.³ .................................. F02C 7/224
[52] U.S. Cl. ..................................... 60/736; 60/738; 60/39.46 P; 431/247
[58] Field of Search .......... 60/736, 737, 738, 39.51 R, 60/39.46 P; 431/247

[56] References Cited

U.S. PATENT DOCUMENTS

| | | | |
|---|---|---|---|
| 2,557,131 | 6/1951 | Miller | 60/39.51 R |
| 2,560,401 | 7/1951 | Allen | 60/738 |
| 2,593,849 | 4/1952 | Clarke et al. | 60/738 |
| 2,810,260 | 10/1957 | Fromm et al. | 60/738 |
| 3,398,528 | 4/1968 | Nakamura et al. | 60/738 |
| 4,008,041 | 2/1977 | Roffe et al. | 431/209 |
| 4,089,638 | 5/1978 | Trucco et al. | 431/209 |

Primary Examiner—Louis J. Casaregola

[57] ABSTRACT

This invention relates to improvements in the art of liquid fuel combustion and, more particularly, concerns a method and apparatus for the controlled gassification of liquid fuels, the thorough premixing of the then gassified fuel with air and the subsequent gas-phase combustion of the mixture to produce a flame substantially free of soot, carbon monoxide, nitric oxide and unburned fuel.

1 Claim, 4 Drawing Figures

APPARATUS FOR THE PREMIXED GAS PHASE COMBUSTION OF LIQUID FUELS

This application is a continuation-in-part of application Ser. No. 852,225, filed 11/17/77, now abandoned.

SUMMARY

Premixing of gassified fuel with air to produce a uniform mixture for subsequent combustion has been shown to be a highly effective method of achieving high combustion efficiency with extremely low levels of soot, carbon monoxide, nitrogen oxides and unburned fuel species emissions.

Many of the most commonly used fuels, such as heavy hydrocarbons, display physical and chemical properties which require great care in the implementation of a pregassification and premixing process. For example, complete gassification of commercial number 2 heating oil requires that the fuel temperature be raised to approximately 650° F. Further increases in temperature simply assure the gassified state of the fuel. However, at temperatures as low as 900° F., the gassified fuel begins to break down chemically forming molecules of both higher and lower molecular weight than that of the original fuel. The new heavy molecules are highly undesirable components as they cause clogging of the gassifier fuel passages and produce high particulate emission levels when they burn. Thus, the range of temperature available for the gassification process is quite narrow and requires very careful control.

The chemical breakdown (pyrolysis) limit on fuel gassification temperature leads to a second important problem. Although the fuel may be pregassified, its heat content is insufficient to prevent some degree of recondensation if it is mixed with a stream of colder air. Although this partial recondensation results in extremely fine fog-like liquid droplets, the combustion properties of the system are degraded in comparison with the all gas-phase process. In addition, agglomeration can take place within the fog to produce larger droplets still and fuel can condense along the walls of the apparatus further degrading the combustion characteristics of the system.

The premixed combustion of prevaporized liquid fuels has been the object of previous inventions. In U.S. Pat. No. 4,008,041, careful control of temperature during the vaporization process was accomplished by utilization of an intermediate heat transfer fluid. In U.S. Pat. No. 4,089,638, the need for an intermediate fluid was eliminated by locating a fuel vaporization coil downstream of the point of flame initiation but sufficiently early in the reaction to avoid subjecting the coil to excessive temperatures. In the present invention, the fuel vaporization coil is located upstream of the region of flame initiation in a volume filled with naturally recirculating products of combustion. This scheme provides the advantage of an isothermal environment for the vaporization process, as taught by the '041 patent, with the simplification of eliminating the need for an intermediate heat transfer fluid, as taught by '638 patent.

It is an object of this invention to provide a means for the controlled gassification of liquid fuels, wherein the temperature of the fuel can be accurately maintained within prescribed limits. It is a further object of this invention to provide a mechanism to thoroughly mix gassified fuel with air prior to combustion which, although allowing thorough mixing, precludes the possibility of fuel recondensation. It is a still further object of this invention to accomplish mixing of fuel and air in a time which is short compared with the spontaneous ignition delay time in order to preclude the possibility of burning during the premixing process.

Other objects and advantages will further become apparent herein after and in the drawing in which.

Figure 1:
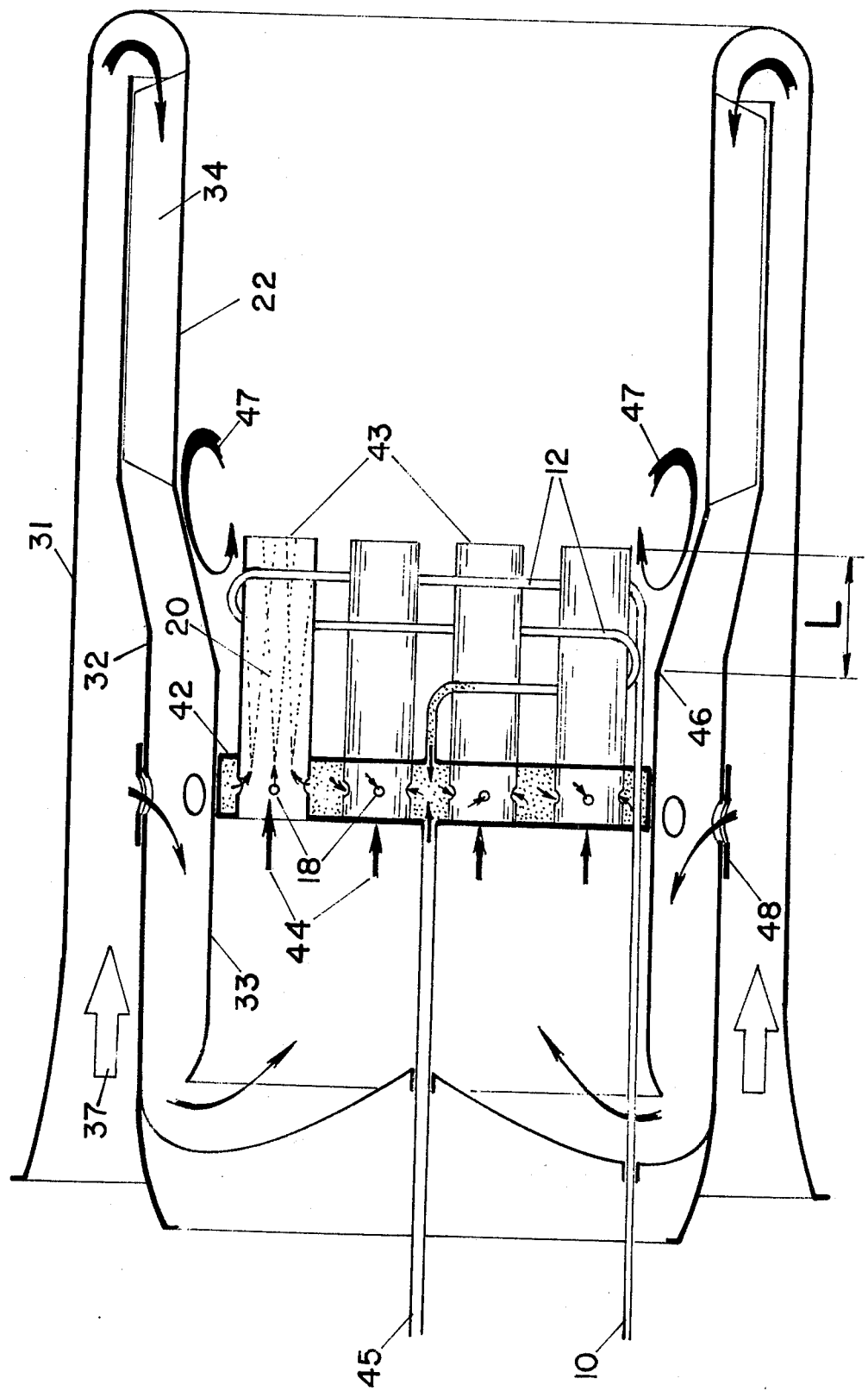
FIG. 1 is a view in side elevation of a machine constructed in accordance with this invention employing a regenerative heater for combustion air and an auxillary supply of gaseous fuel to be used during the starting process.

In describing the preferred embodiments of this invention illustrated in the drawings, specific terminology will be used for the sake of clarity. However, it is not intended to be limited to the specific terms so selected and it is to be understood that each specific term includes all technical equivalents which operate in a similar manner to accomplish a similar purpose. Moreover, the terms "air" or "combustion air" may be taken to cover any oxidizing gaseous medium.

In the preferred form of the apparatus illustrated in FIG. 1, the apparatus is seen to consist of an outer casing 31, an intermediate casing 32 and an inner casing 22 provided with a plurality of heat transfer fins 34; a plenum chamber 42 connected to a gaseous fuel supply tube 45 and a liquid fuel gassification tube 12 fed by a liquid fuel supply line 10; a plurality of mixing tubes 43, each of which is supported by the plenum chamber 42 and interconnected with it by means of injection holes 18; and a bypass control ring 48, whose multiple hole pattern matches the hole pattern in the intermediate casing 32.

In operation, air 37 from a fan, compressor or pump, not shown, enters the apparatus through the passage formed between the outer and intermediate casings. The air is preheated as it passes over the inner casing 22 and the heat transfer fins 34 attached thereto before entering the inner casing passage 33. Air preheat temperature is modulated by adjusting the bypass control ring 48 to allow a limited amount of unheated air to bypass the heat transfer surfaces. Liquid fuel enters through supply tube 10 and passes through gassification tube 12 located within the region of naturally recirculating combustion products. Heat transferred from the recirculating gases to the gassification tube 12 causes the liquid fuel within the tube to gassify before entering plenum chamber 42 which distributes the gaseous fuel over the plurality of injection holes 18. Gassified fuel enters the mixer tubes 43 through injection holes 18 and mixes with the preheated air in regions 20, creating a uniform gas phase stream of fuel and air by the mixer tube exhaust station. The fuel/air mixture is lit by a spark or flame ignition source, not shown, and forms a series of flames which anchor to the mixer tube exhaust stations by virtue of the sudden aerodynamic expansion. The inner casing 22 expands at corner 46 and this expansion creates a vortex of hot recirculating combustion gases 47 which transfers heat to the fuel gassification coil 12.

The assembly formed by plenum chamber 42 and plurality of premixing tubes 43 is axially movable so that the distance "L" between the premixing tube exhaust station and the expansion corner 46 can be adjusted during operation. As the distance "L" increases, the amount of heat transfered to the gassification tube 12 by recirculating vortex 47 also increases. Thus, the apparatus provides a mechanism to control the temperature of the gassified fuel by properly adjusting the distance "L".

The apparatus is started by admitting a supply of auxillary gaseous fuel to the plenum chamber 42 through supply tube 45 which is injected through orifices 18 into the premixing tubes 43 where it mixes with the incoming unheated combustion air. The mixture of air and auxillary gaseous fuel is ignited and burns in combustion duct 22 transferring heat through fins 34 to gradually preheat the combustion air. Once the appropriate air preheat temperature is achieved, liquid fuel flow is initiated through gassification tube 12. As the flow of liquid fuel is gradually increased, the flow of auxillary gaseous fuel entering the common plenum 42 is correspondingly decreased until the system is fed entirely by the liquid fuel supply.

Figures 2, 3:
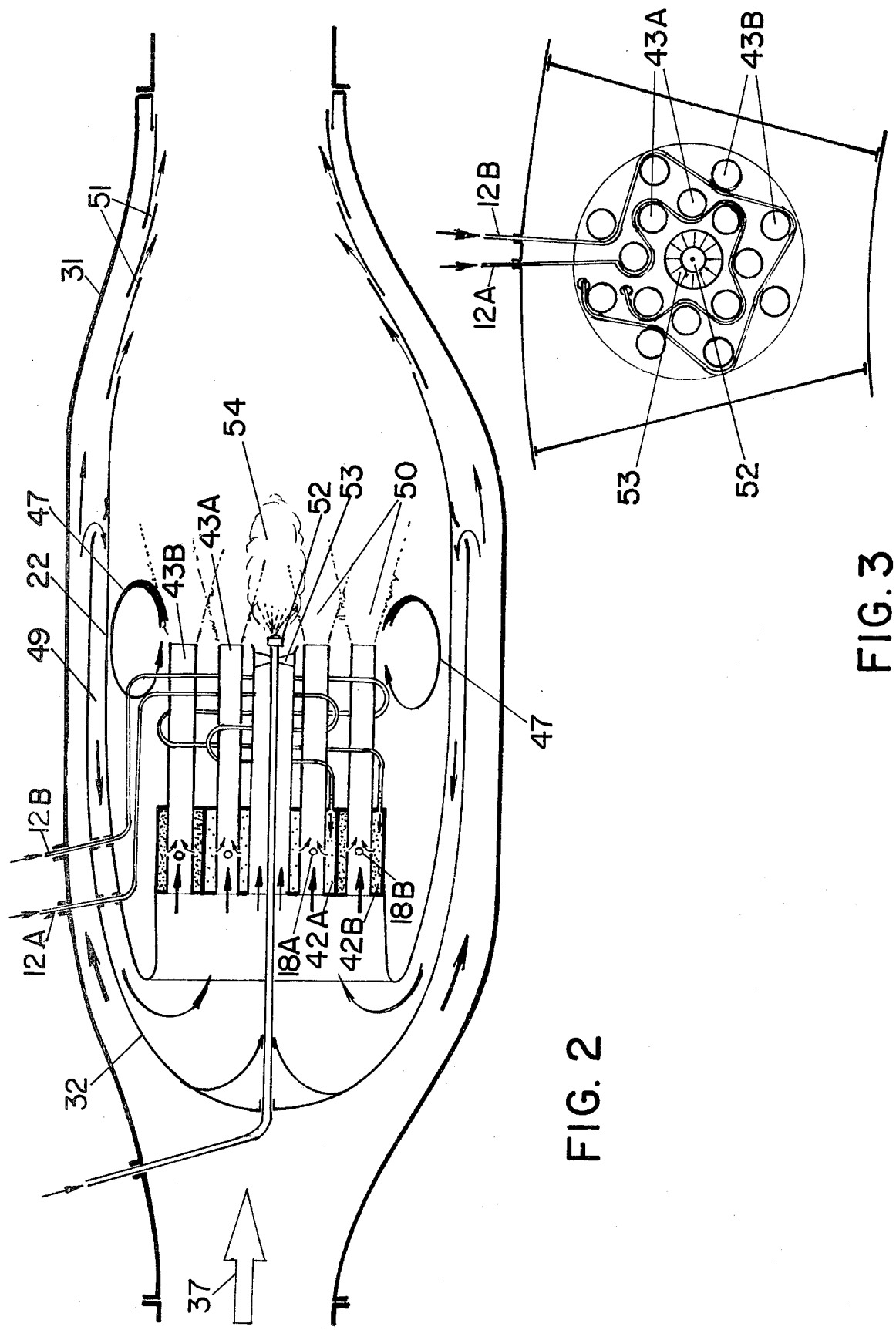
FIG. 2 illustrates in side elevation an embodiment of this invention which operates as a combustor in a gas turbine engine.
FIG. 3 is a front view of the plenum/mixer tube assembly of the apparatus illustrated in FIG. 2.

FIG. 2 illustrates an embodiment of this invention as a combustor in a gas turbine engine. Here, air 37 enters the device preheated by the action of the gas turbine compressor, not shown, flowing between the outer casing 31 and the intermediate casing 32. A portion of the air enters the preheat passage 49 formed between the intermediate casing 32 and the inner casing 22 and is heated by its contact with the inner casing wall. The remainder of the air bypasses the primary combustion zone 50 and enters through dilution holes 51. Liquid fuel enters gassification tubes 12A and 12B, located within the region of naturally recirculating hot combustion products induced by vortex 47, wherein it is vaporized prior to being delivered to separate plena 42A and 42B respectively. Plenum 42A supplies fuel through injection holes 18A to the array of mixer tubes 43A clustered in the central area of the combustor. Plenum 42B supplies fuel through injection holes 18B, to the array of mixer tubes 43B near the combustor periphery. A conventional atomizing nozzle 52 and flameholder 53 protrude through the center of the plenum assembly. During the starting transient, atomizing nozzle 52 is used to produce a conventional diffusion flame 54, which supplies the heat necessary to gassify fuel in the gassification tubes 12A and 12B and to pilot the premixed flames which form when fuel flow to the gassification tubes is initiated. A conventional igniter, not shown, is used to light the diffusion flame 54. It is often necessary to vary overall fuel/air ratio over rather wide limits in a gas turbine engine. However, the range of optimum fuel/air ratios for the premixed primary zones 50 of the combustor is relatively small. In order to minimize the variation of fuel/air ratio in the primary zones as the overall engine fuel/air ratio varies, the two plena 42A and 42B are employed. At conditions of low overall fuel/air ratio, fuel flows only through gassification tube 12A, filling plenum 42A and causing flames to anchor to mixing tubes 43A exhaust stations. As engine fuel requirements increase, additional fuel is fed through gassification tube 12B into plenum 42B causing flames to form at the exit of mixing tubes 43B. During operation at conditions where the fuel/air ratio in mixing tubes 43B is below the lean extinction limit the premixed flames 50 from the central array of mixing tubes 43A act as a pilot to allow combustion in the outer region comprising mixing tubes 43B.

Figure 4:
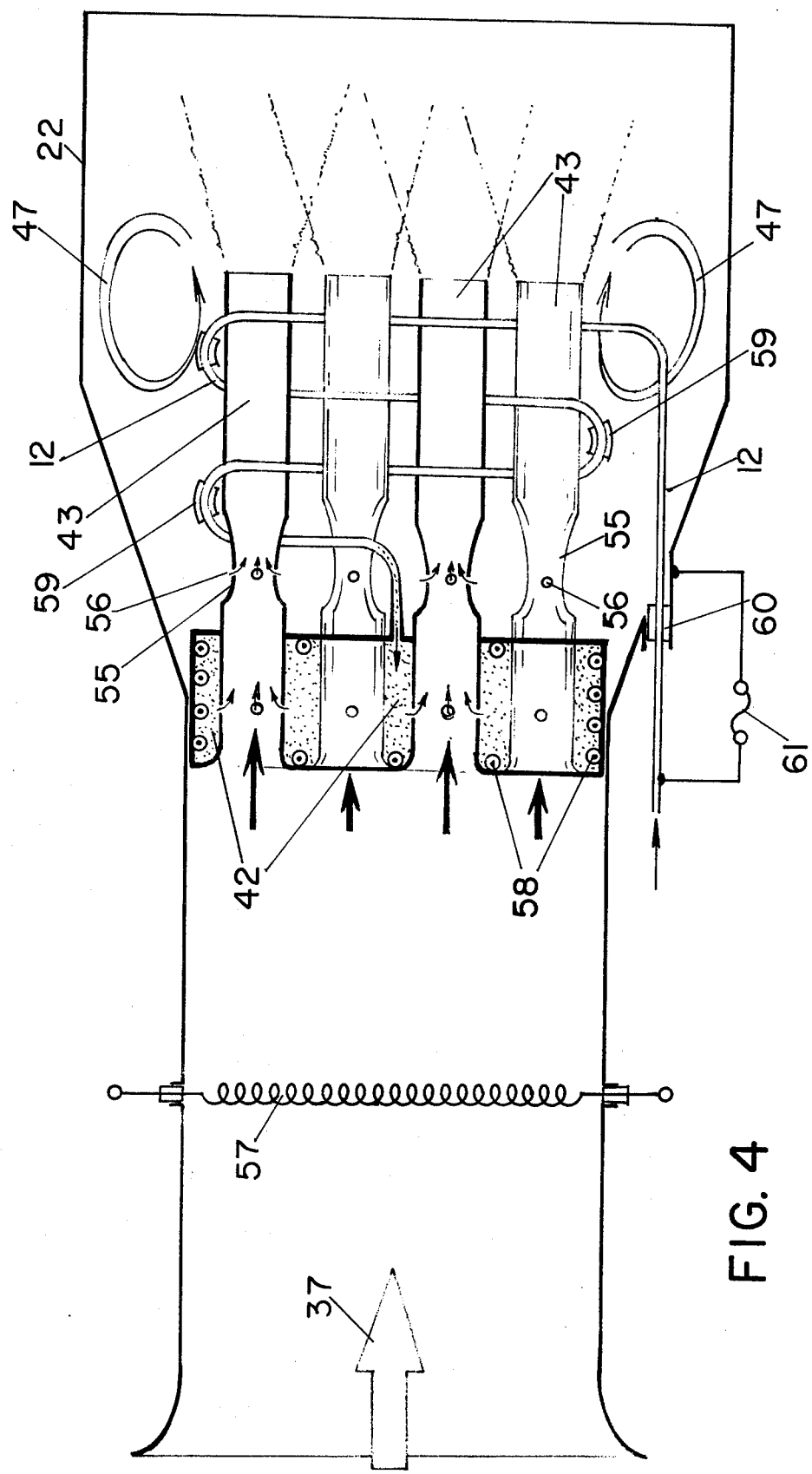
FIG. 4 illustrates an embodiment of this invention wherein electric resistance heaters are used to preheat the apparatus and hot products of combustion are aspirated into the fuel/air mixing tubes to prevent fuel recondensation.

FIG. 4 illustrates an embodiment of this invention which makes possible the aspiration of recirculated combustion products and their premixing with the unburned fuel/air mixture. Here, the premixing tubes 43 are internally contoured to produce a venturi throat 55 where the local static pressure is reduced causing the aspiration through holes 56 of combustion products which have been convected backward by vortex 47. This aspiration and mixing increases the temperature of the premixed stream, preventing fuel recondensation. In the embodiment of FIG. 4, electric resistance heating elements are employed to provide the necessary initial conditions to start operation. Resistance heater 57 preheats the incoming combustion air 37 and resistance heater 58 preheats the fuel distribution plenum 42 to preclude fuel recondensation on cold wall surfaces. The fuel gassification tube 12 is electrically isolated from the premixing tube 43 and inner casing 22 by insulating sleeves 59 and 60. The gassification tube 12 is constructed from an electrically conductive material of relatively high resistivity so that it can be preheated by passing an electric current through it by means of the grounded source 61.

During the starting transient, fuel vaporization energy is supplied by the electric current passed through the vaporization tube 12. Once sufficient fuel is vaporized to fill the distribution plenum 42, energy for fuel vaporization is derived from the resulting combustion process and electrical heating of the gassification tube 12, air heater 57 and plenum heater 58 can be terminated.

Various changes and modification may be made without departing from the spirit of this invention and the scope thereof as defined in the following claims.

What we claim is:

1. A combustion apparatus comprising, in combination, outer, intermediate and inner casings disposed such that combustion air flows from a passage formed between said outer and intermediate casings into a passage formed by said intermediate and inner casings, air supply means, liquid fuel supply means, a combustion duct which expands to produce a region of recirculating hot gases, fuel gassification tube disposed within said region of recirculating hot gases so as to utilize heat liberated by combustion to accomplish liquid fuel gassification, a plurality of fuel/air premixing tubes, a plenum chamber which receives gassified fuel from said fuel gassification tubes and distributes said gassified fuel to orifices in said fuel/air premixing tubes, regenerative heat exchange means located between said combustion duct and said intermediate casing to preheat the combustion air stream, means to vary the position of the assembly comprised of said plenum chamber and said fuel/air premixing tubes, ignition means, means to allow a portion of the combustion air to bypass the regenerative heat exchange section, and means to supply gaseous fuel into said plenum chamber to start the process.

* * * * *